J. & E. PANTON,

Assignors, by mesne assignments, to W. H. BEEBE.

Harvester.

No. 9,239. Reissued June 8, 1880.

Witnesses:

W. C. Corlies,

Jno. C. MacGregor,

Inventors:

Jason Panton and

Edwin Panton.

By Coburn & Thacher,

Attorneys.

N. PETERS, PHOTO-LITHOGRAPHER, WASHINGTON, D. C.

UNITED STATES PATENT OFFICE.

JASON PANTON AND EDWIN PANTON, OF LONDON, ONTARIO, CANADA, ASSIGNORS, BY MESNE ASSIGNMENTS, TO WILLIAM H. BEEBE, OF CHICAGO, ILLINOIS.

HARVESTER.

SPECIFICATION forming part of Reissued Letters Patent No. 9,239, dated June 8, 1880.

Original No. 132,408, dated October 22, 1872. Application for reissue filed April 3, 1880.

*To all whom it may concern:*

Be it known that we, JASON PANTON and EDWIN PANTON, of the city of London, county of Middlesex, and Province of Ontario, in the Dominion of Canada, have invented certain new and useful Improvements in Harvesters, which are fully set forth in the following specification, reference being had to the accompanying drawings, in which—

Figure 1:
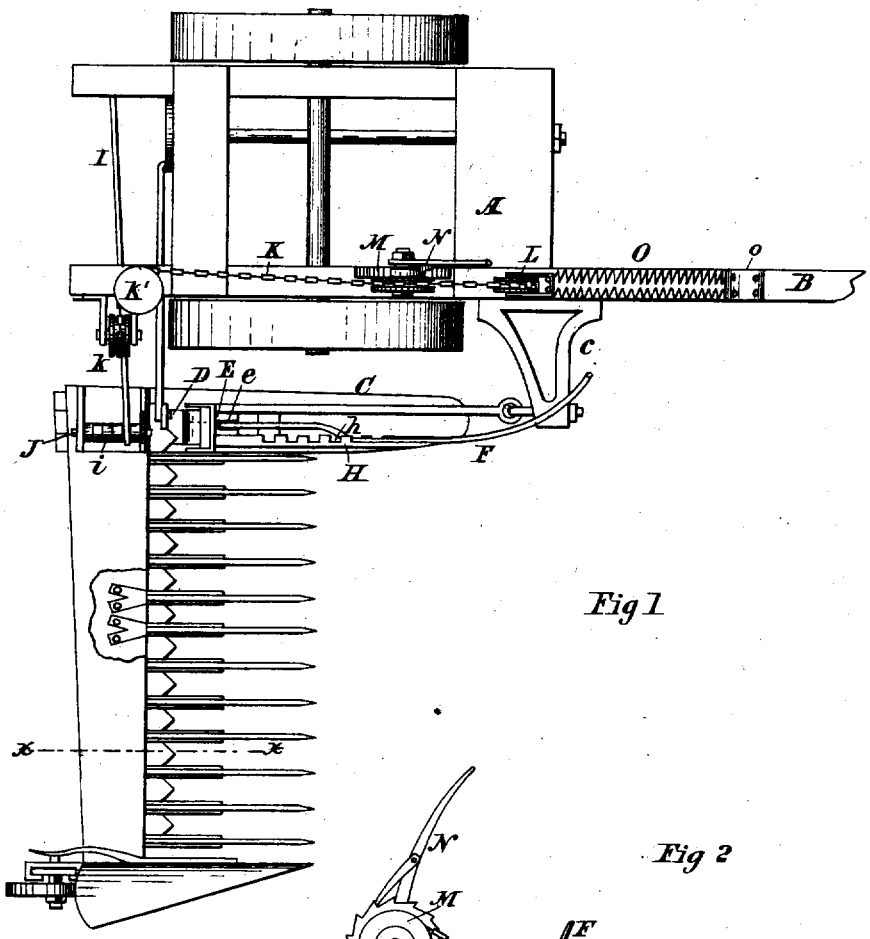
Figure 2:
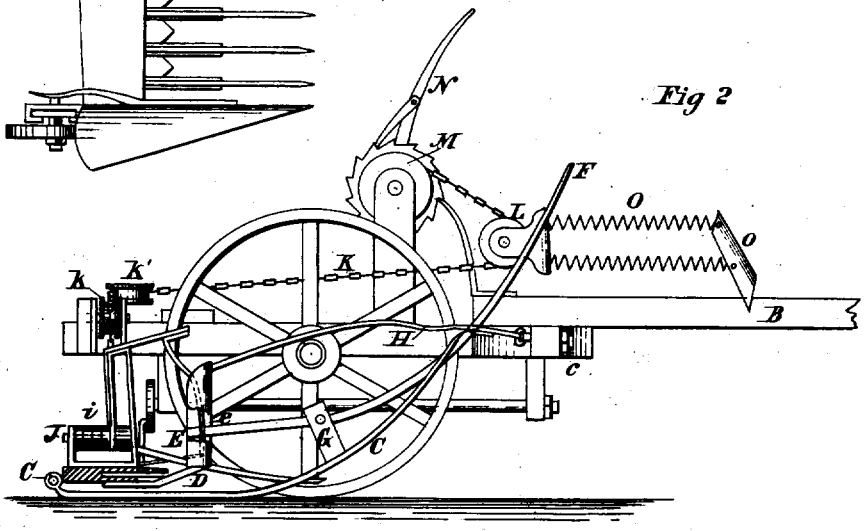

Figure 1 represents a plan view of a harvester embodying our improvements; and Fig. 2, a side elevation of the same, the finger-beam being in section.

Our invention relates to that class of machines in which a drag-bar is used for carrying the finger-beam forward over the ground, and the shoe is hinged to the drag-bar, so as to be vibrated to raise and depress the fingers to change their pitch.

The invention consists in the combination of a drag-bar and a shoe carrying the finger-beam and hinged to the drag-bar at its rear end, so as to permit a rocking movement, and a lever mounted on the drag-bar in front of the pivot of the shoe, whereby the shoe and finger-beam are rocked or tilted.

It also consists in the combination of a drag-bar, a shoe carrying the finger-beam and hinged to the drag-bar at its rear end, so as to permit a rocking movement, a lever mounted on the drag-bar in front of the pivot of the shoe, for vibrating the shoe, and a locking device whereby the shoe may be held up in any position to which it may be adjusted.

It also consists in a device for adjusting the hinged connection between the coupling-arm and the shoe transversely of the latter, whereby the shoe and finger-beam are balanced, so as to be lifted in a level position by a single lever.

It also consists in combinations of special devices, which will be hereinafter named and fully explained.

The several parts of a harvesting-machine in which we have in one way embodied our invention will now be described, and the particular improvements which it is desired to secure by Letters Patent pointed out more definitely in the claims.

In the drawings, A represents the main frame of the machine, to which is attached a stiff tongue or pole, B.

On the grain side of the machine, and outside of the supporting-wheel, is a drag-bar, C, which is hinged at its forward end to a suitable bracket, *c*, attached to the main frame.

The drag-bar extends backward to the rear of the machine, in the usual way, and the shoe D is hinged at its rear end to the drag-bar, which permits the forward end to be raised and lowered, the shoe vibrating on its hinge, thereby vibrating or rocking the finger-beam to raise and lower the ends of the fingers, thus enabling them to be brought nearer to or raised farther from the ground over which the finger-beam is passing.

The forward bent end of the shoe is arranged in a guide-standard, E, erected on the drag-bar, the side flanges of which embrace the end of the shoe.

A hand-lever, F, is mounted on the drag-bar, being pivoted to a standard, G, fastened thereto. The rear end of this lever passes back through a vertical slot, *e*, in the standard E, and is inserted loosely in the forward bent end of the shoe. The forward end of the lever is extended upward, so that it may be conveniently grasped by the driver on the machine. Obviously the vibration of this lever will tilt or rock the shoe and finger-beam, and this may be done at pleasure by the attendant, to change the position of the fingers and cutting apparatus, as occasion may require.

A rack-bar, H, is also arranged upon the drag-bar, being provided with notches *h*, with which the lever F engages, thereby locking the lever and holding the shoe up in any position to which it may be adjusted, and in fact, in this instance, owing to the peculiar mode of connecting the lever with the shoe, securing the latter from movement either up or down. The usual transverse coupling-bar I is employed, being hinged at its inner end to the frame of the machine and at its outer end to the shoe, thus, in connection with the forward hinge of the drag-bar, permitting the raising and lowering of either end of the finger-beam. The connection between the coupling-bar and the shoe is made, however, in this instance, by means of a long pivot-bolt, J, which allows the coupling-bar to be moved forward and backward at pleasure thereon, so as to be adjusted to a point where the finger-beam will be balanced on this support when raised. A number of washers, *i*, are put on this bolt for the purpose of adjusting and retaining the coupling-bar in position at the desired point. A lifting-chain, K, is attached at one end to the coupling-bar, and is passed up over and around the pulleys *k k'* at the rear of the machine, thence forward to a pulley, L, around which it passes, and is then carried back a short distance to a ratchet-wheel, M, provided with a pawl-lever, N. The block of the pulley L is fastened to the forward ends of springs O, which extend forward and are attached to the bracket *o* on the pole, and thus serve to assist in raising the finger-beam by the coupling-bar by means of the lifting-chain and ratchet-wheel.

The pulleys *k k'* are made adjustable backward and forward to accommodate the adjustment of the coupling-bar in this direction.

The tilting or rocking of the finger-beam is easily effected by mounting the tilting-lever on the drag-bar.

The tilting device is thus made simple and cheap, and its relation to the shoe is not changed by the irregular movements of the finger-beam as the latter is carried forward over uneven ground. The lever is brought close to the shoe in a convenient position to vibrate the latter, and is supported entirely by the drag-bar.

Having thus described our invention, what we claim as new, and desire to secure by Letters Patent, is—

1. In a harvesting-machine, the combination of the following elements: a drag-bar, a shoe connected to the drag-bar at its rear end by a hinge which permits the shoe to be rocked or tilted in the direction of its length, a finger-beam attached to the shoe, and a lever mounted on the drag-bar in front of the pivot of the shoe, whereby the front end of the shoe may be raised at will by the driver on the machine.

2. The combination, in a harvesting-machine, of the following elements: a drag-bar, a shoe hinged thereto at its rear end so as to be tilted in the direction of its length, a finger-beam attached to the shoe, a lever mounted on the drag-bar in front of the pivot of the shoe, for lifting the forward end of the shoe, and a locking device for locking the lever to hold the shoe in position when raised by the lever.

3. The combination, in a harvesting-machine, of the following elements: a drag-bar, a shoe carrying the finger-beam, and connected at its rear end to the drag-bar by a hinge which permits the shoe to be tilted in a direction transverse to the finger-beam, and a lever mounted on the drag-bar and connected to the shoe in front of its pivot, so as to vibrate the latter positively in both directions.

4. The combination, in a harvesting-machine, of the following elements: a drag-bar, a shoe carrying the finger-beam and connected to the drag-bar by a hinge at its rear end which permits the shoe to be tilted in a direction transverse to the finger-beam, and a lever mounted on the drag-bar and connected to the shoe in front of its pivot, so as to vibrate the latter positively in both directions, and a locking device whereby the shoe may be secured permanently in any position to which it may be adjusted.

5. The combination, in a harvesting-machine, of the following elements: a drag-bar, a shoe hinged thereto at its rear end so as to be tilted in the direction of its length, a guide by which the forward end of the shoe is held as it vibrates up and down, and a tilting-lever mounted on the drag-bar in front of the pivot of the shoe.

6. The combination, in a harvesting-machine, of the following elements: a shoe carrying the finger-beam, a coupling-bar hinged at one end to the main frame and connected to the shoe at the other end by a hinge-joint, which permits the coupling-bar to be adjusted forward and backward in relation to the shoe to balance the weight of the latter and the finger-beam when lifted, and a lifting-lever connected to the coupling-bar, whereby the shoe and finger-beam may be raised and lowered in a substantially level position by a single lever.

7. The drag-bar C, in combination with the shoe D, hinged to the drag-bar at its rear end so as to vibrate in the direction of its length, the hinged coupling-bar I, the tilting-lever F, mounted on the drag-bar and directly connected to the forward end of the shoe, and a rack-bar, H, substantially as described.

8. The springs O, in combination with the chain K, ratchet-wheel M, lever N, coupling-bar I, pulley *k* and *k'*, hinge-bolt J, provided with adjusting-washers *i*, and shoe D, carrying the finger-beam, all being constructed and operating substantially as described.

JASON PANTON.
EDWIN PANTON.

Witnesses:
W. PANTON,
R. POCOCKE.